(12) United States Patent
Ogura et al.

(10) Patent No.: US 9,776,280 B2
(45) Date of Patent: Oct. 3, 2017

(54) LASER WELDING METHOD

(71) Applicant: TOYOTA JIDOSHA KABUSHIKI KAISHA, Toyota-shi, Aichi (JP)

(72) Inventors: Shuhei Ogura, Nagakute (JP); Kazuyuki Ogusu, Okazaki (JP); Jyunichiro Makino, Nagakute (JP); Hiroaki Kishi, Nagoya (JP); Kousuke Tsuji, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 14/935,002

(22) Filed: Nov. 6, 2015

(65) Prior Publication Data
US 2016/0136756 A1 May 19, 2016

(30) Foreign Application Priority Data

Nov. 18, 2014 (JP) ................. 2014-233769

(51) Int. Cl.
| | |
|---|---|
| B23K 26/062 | (2014.01) |
| B23K 26/21 | (2014.01) |
| B23K 26/70 | (2014.01) |
| B23K 31/12 | (2006.01) |
| B23K 26/06 | (2014.01) |
| B23K 26/03 | (2006.01) |

(52) U.S. Cl.
CPC ........ B23K 26/0626 (2013.01); B23K 26/032 (2013.01); B23K 26/21 (2015.10); B23K 26/705 (2015.10); B23K 26/706 (2015.10); B23K 26/707 (2015.10); B23K 31/125 (2013.01)

(58) Field of Classification Search
USPC ............ 219/121.61–121.64, 121.76, 121.77, 219/121.83
See application file for complete search history.

(56) References Cited

U.S. PATENT DOCUMENTS

| | | | |
|---|---|---|---|
| 2005/0263507 A1 | 12/2005 | Yamazaki et al. | |
| 2006/0194354 A1* | 8/2006 | Okumura .......... | H01L 21/02678 438/16 |
| 2011/0026016 A1 | 2/2011 | Kawazoe et al. | |

(Continued)

FOREIGN PATENT DOCUMENTS

| | | | |
|---|---|---|---|
| JP | 2005131645 A | * | 5/2005 |
| JP | 2005302827 A | | 10/2005 |

(Continued)

*Primary Examiner* — Samuel M Heinrich
(74) *Attorney, Agent, or Firm* — Oliff PLC (57) ABSTRACT

A laser welding method is capable of easily restraining poor welding when spatters adhere to a protective glass of an optical system. The laser welding method includes a step of calculating a decrease-amount of the laser power before laser welding is performed by irradiating a welding portion of a workpiece with the laser beam having a predetermined power. The step of calculating the decrease-amount includes irradiating the welding portion with an inspecting laser beam having a power smaller than the predetermined power, receiving a return beam of the inspecting laser beam, measuring an intensity of the return beam, and comparing the intensity of the return beam with a standard intensity to calculate an amount of decrease in power of the inspecting laser beam at the welding portion.

3 Claims, 7 Drawing Sheets

(56) References Cited

U.S. PATENT DOCUMENTS

| | | | |
|---|---|---|---|
| 2011/0042360 A1 | 2/2011 | Takahashi et al. | |
| 2015/0246413 A1* | 9/2015 | Kawakita ............ | B23K 31/125 |
| | | | 219/121.64 |

FOREIGN PATENT DOCUMENTS

| | | |
|---|---|---|
| JP | 2005-334928 A | 12/2005 |
| JP | 2009-039773 A | 2/2009 |
| JP | 2012157893 A | 8/2012 |
| JP | 2012187591 A | 10/2012 |
| WO | 2009/122758 A1 | 10/2009 |

* cited by examiner

LASER WELDING METHOD

TECHNICAL FIELD

Preferred embodiments relate to a laser welding method, and specifically to a technique for restraining poor welding caused by dirt on a protective glass provided for protection of an optical system of a laser processing device.

BACKGROUND

Conventionally, a laser welding method using a laser processing device is widely adopted.

When welding is performed using the laser processing device, spatters fly apart at a position to which a laser beam is applied, and may adhere to the laser processing device. For this reason, in the laser processing device, a protective glass is commonly arranged at the front end part of an optical system in order to protect the optical system from the spatters.

When the spatters adhere to the protective glass, the laser beam is partly blocked, which results in decrease of the power of the laser beam. For this reason, a technique for determining whether the spatters adhere to the protective glass is developed, and is disclosed in JP-A 2005-302827.

JP-A 2005-302827 discloses an apparatus including an independent applying device for applying light to a protective glass, which is reflected by the protective glass, and an independent receiving device for receiving the reflected light from the protective glass. The apparatus compares the intensity of the light received by the receiving device with a predetermined standard value, thereby determining whether the protective glass is dirty or not.

Intensive studies by the present inventors have shown that, when the spatters adhere to the protective glass, the focal length of the laser beam varies due to "thermal lens effect". The "thermal lens effect" is a phenomenon in which the laser beam is absorbed by the spatters adhering to the protective glass, and the refractive index of the protective glass varies in the parts around the spatters.

The apparatus disclosed in JP-A 2005-302827 can determine whether the protective glass is dirty or not, but cannot determine how far the focal length of the laser beam varies due to the thermal lens effect.

For this reason, conventionally, if the focal length of the laser beam varies due to the thermal lens effect during laser welding, the focal length cannot be adjusted properly. Therefore, a cause of poor welding has been left unsolved.

SUMMARY

Preferred embodiments address the problem described above. An object of preferred embodiments is to provide a laser welding method capable of easily restraining poor welding when spatters adhere to a protective glass of an optical system.

A problem to be addressed by the preferred embodiments is described above, and ways of addressing the problem are described below.

According to one embodiment, a laser welding method for performing laser welding to welding portions of a workpiece, using a laser processing device that includes: (a) a laser oscillator; (b) an optical system which irradiates the welding portion with a laser beam emitted from the laser oscillator; (c) a protective glass which is arranged at an end part of the optical system facing the welding portion; (d) an optical receiver which receives a return beam that is incident into the optical system from reflection of the laser beam by the welding portion; and (e) a controller which controls an output of the laser oscillator based on an intensity of the return beam received by the optical receiver. The laser welding method includes (1) calculating a decrease amount of the laser power before the welding portion is irradiated with the laser beam having a predetermined power, by: (1a) emitting an inspecting laser beam having a power smaller than the predetermined power to the welding portion with the laser oscillator and the optical system; (1b) receiving the return beam of the inspecting laser beam having passed through the protective glass with the optical receiver; (1c) measuring an intensity of the return beam of the inspecting laser beam with the controller; and (1d) calculating, with the controller, an amount of decrease in power of the inspecting laser beam by comparing the intensity of the return beam of the inspecting laser beam with a previously-determined standard intensity of the return beam of the inspecting laser beam. The laser welding method further includes (2) adjusting the output of the laser oscillator, using the controller, based on the calculated amount of the decrease in power of the inspecting laser beam, and (3) emitting the laser beam at the adjusted output to the welding portion to perform the laser welding with the laser processing device.

According to embodiments, the laser welding method can further include calculating a focal-deviation-amount after the laser welding has been performed to the welding portion at least once and before the laser welding is performed to a next welding portion. Calculating the focal-deviation-amount includes: emitting the inspecting laser beam to the next welding portion with the laser oscillator and the optical system; receiving the return beam of the inspecting laser beam from the next welding portion with the optical receiver; measuring the intensity of the return beam of the inspecting laser beam from the next welding portion with the controller; and calculating, with the controller, an amount of focal deviation of the laser beam at the next welding portion based on the intensity of the return beam of the inspecting laser beam from the next welding portion and the amount of the decrease in power of the inspecting laser beam calculated in the step of calculating the decrease amount of the laser power.

According to embodiments, the laser welding method can include: adjusting a focal length of the laser beam with a focus adjuster of the optical system based on the calculated amount of the focal deviation after performing the step of calculating the focal-deviation-amount and before the laser welding is performed to the next welding portion by the laser processing device; and then performing the laser welding to the next welding portion with the laser processing device after adjusting the focal length.

Preferred embodiments can produce the following effects.

Dirt on a protective glass can be easily detected using a laser processing device configured similarly to a conventional one, which can prevent laser welding from being performed with a laser beam whose power is reduced. This makes it possible to restrain poor welding.

An amount of focal deviation caused by the thermal lens effect can be detected.

The amount of the focal deviation caused by the thermal lens effect can be detected, and laser welding with the laser beam whose power is reduced can be prevented. This makes it possible to reliably restrain poor welding.

DETAILED DESCRIPTION

An embodiment is described below.

First, an overall structure of a laser processing device achieving a laser welding method according to an embodiment is described with reference to FIG. 1.

Figure 1:
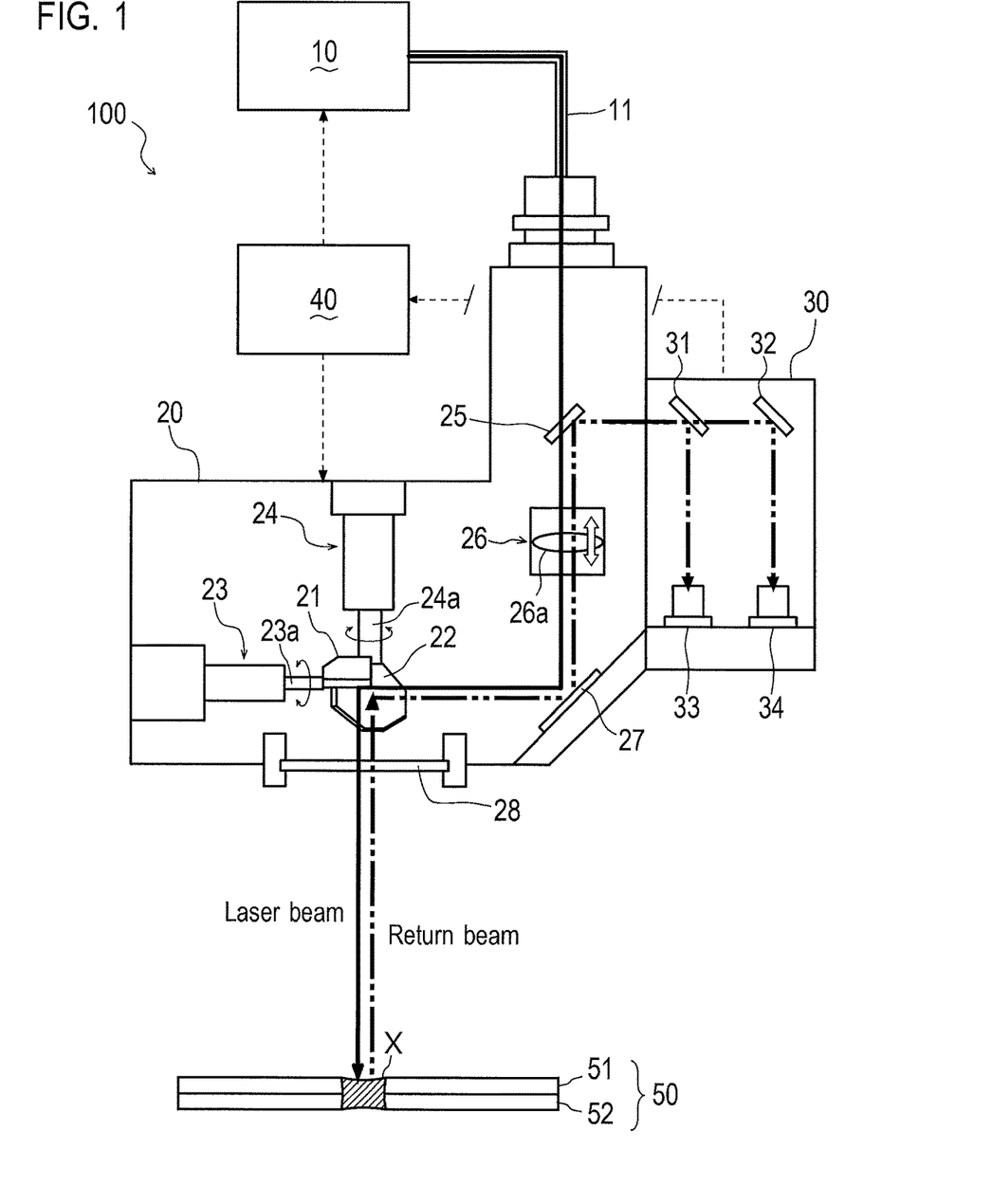
FIG. 1 shows an overall structure of a laser processing device achieving a laser welding method according to an embodiment.

FIG. 1 schematically shows a structure of a laser processing device 100. In FIG. 1, for the sake of convenience, a laser beam is indicated by a solid line, a return beam is indicated by a two-dot chain line, and an electric signal line is indicated by a broken line.

The laser processing device 100 performs laser welding, thereby joining two steel plates 51 and 52 constituting a workpiece 50. The laser processing device 100 includes a laser oscillator 10, an optical system 20, an optical receiver 30, and a controller 40.

In the present embodiment, the workpiece 50 to be welded is formed by putting the two steel plates 51 and 52 one on top of the other. The laser processing device 100 irradiates a predetermined part of the workpiece 50 with the laser beam having a predetermined power, to form a welding portion X.

The laser oscillator 10 is a source of oscillation of the laser beam. The laser oscillator 10 is connected to the optical system 20 through an optical fiber 11. The optical system 20 introduces the laser beam to emit the laser beam to the workpiece 50.

The optical system 20 has a pair of galvano-mirrors 21 and 22.

The galvano-mirror 21 is supported by a shaft 23a of a motor 23. The galvano-mirror 21 is configured to rotate on the shaft 23a when the motor 23 is driven. The galvano-mirror 22 is supported by a shaft 24a of a motor 24. The galvano-mirror 22 is configured to rotate on the shaft 24a when the motor 24 is driven.

In the galvano-mirror 21, the shaft 23a is arranged horizontally. In the galvano-mirror 22, the shaft 24a is arranged vertically.

The optical system 20 drives the motors 23 and 24 to adjust relative angles of the galvano-mirrors 21 and 22, thereby adjusting a position to which the laser beam is applied to scan the welding portion X of the workpiece 50 with the laser beam.

The laser beam entered into the optical system 20 from the laser oscillator 10 through the optical fiber 11, first, passes through a mirror 25.

The mirror 25 totally transmits the laser beam entered from the laser oscillator 10, and totally reflects the return beam from the workpiece 50. The mirror 25 is inclined so as to reflect the return beam to the optical receiver 30.

In the optical system 20, the laser beam having passed through the mirror 25 passes through a focus adjuster 26, and thereby the focal length is adjusted. Thereafter, the laser beam is reflected to the galvano-mirror 22 by a mirror 27.

Then, the laser beam reflected by the galvano-mirror 22 is reflected by the galvano-mirror 21 so as to be applied to the welding portion X of the workpiece 50.

The focus adjuster 26 has a lens 26a capable of moving in the direction of the axis of the laser beam. The focus adjuster 26 adjusts the focal length of the laser beam by adjusting the position of the lens 26a in the direction of the axis of the laser beam.

The optical system 20 further has a protective glass 28 arranged at the end part of the optical system 20 facing the workpiece 50.

The protective glass 28 is provided for protecting the optical system 20 from spatters which are produced when the workpiece 50 is irradiated with the laser beam.

In other words, the protective glass 28 is provided in consideration of adhesion of the spatters to the surface thereof. The protective glass 28 is replaced depending on degree of dirt or at regular intervals.

The return beam which is a reflected light of the laser beam applied to the welding portion X of the workpiece 50 enters into the above-mentioned optical system 20.

The return beam incident into the optical system 20 through the protective glass 28 is reflected by the galvano-mirrors 21 and 22, the mirror 27, and the mirror 25 in order, and then is introduced into the optical receiver 30.

In other words, the optical system 20 in the present embodiment adjusts at least one of the focal length and the position to which the laser beam is applied in the welding portion X. In addition, the optical system 20 introduces the return beam of the laser beam applied to the welding portion X into the optical receiver 30.

Note that the optical system 20 has a collimating lens, a Fθ lens, a condensing lens and various filters (not shown).

The optical receiver 30 receives the return beam of the laser beam applied to the welding portion X. The optical receiver 30 has a beam splitter 31, a mirror 32, and sensors 33 and 34.

The beam splitter 31 splits the return beam according to bandwidth. In the present embodiment, the beam splitter 31 splits the return beam into two.

The sensors 33 and 34 detect intensities of two beams into which the return beam is split according to bandwidth by the beam splitter 31.

In the present embodiment, the sensor 33 is suitable for receiving a light whose wavelength is approximately 500 nm, and the sensor 34 is suitable for receiving a light whose wavelength is approximately 800 nm.

The controller 40 is connected to the laser oscillator 10, the optical system 20 and the optical receiver 30.

The controller 40 controls the output of the laser oscillator 10 based on the intensity of the return beam received by the optical receiver 30.

Moreover, the controller 40 controls the motors 23 and 24 constituting the optical system 20 to adjust the position to which the laser processing device 100 emits the laser beam, and controls the focus adjuster 26 to adjust the focal length of the laser beam emitted by the laser processing device 100.

The laser processing device 100 is configured similarly to a conventional device used for laser welding. Therefore, the conventional device may be used with no change.

Furthermore, the controller 40 determines, based on the intensity of the return beam received by the optical receiver 30, whether the protective glass 28 is dirty or not. The controller 40 calculates an amount of decrease in power of the laser beam of the laser processing device 100 at the welding portion X, based on the intensity of the return beam received by the optical receiver 30. The controller 40 calculates an amount of focal deviation of the laser beam of the laser processing device 100, based on the intensity of the return beam received by the optical receiver 30.

A method for calculating the amount of the decrease in power of the laser beam at the welding portion X is described with reference to FIGS. 2 to 5.

Figure 2:
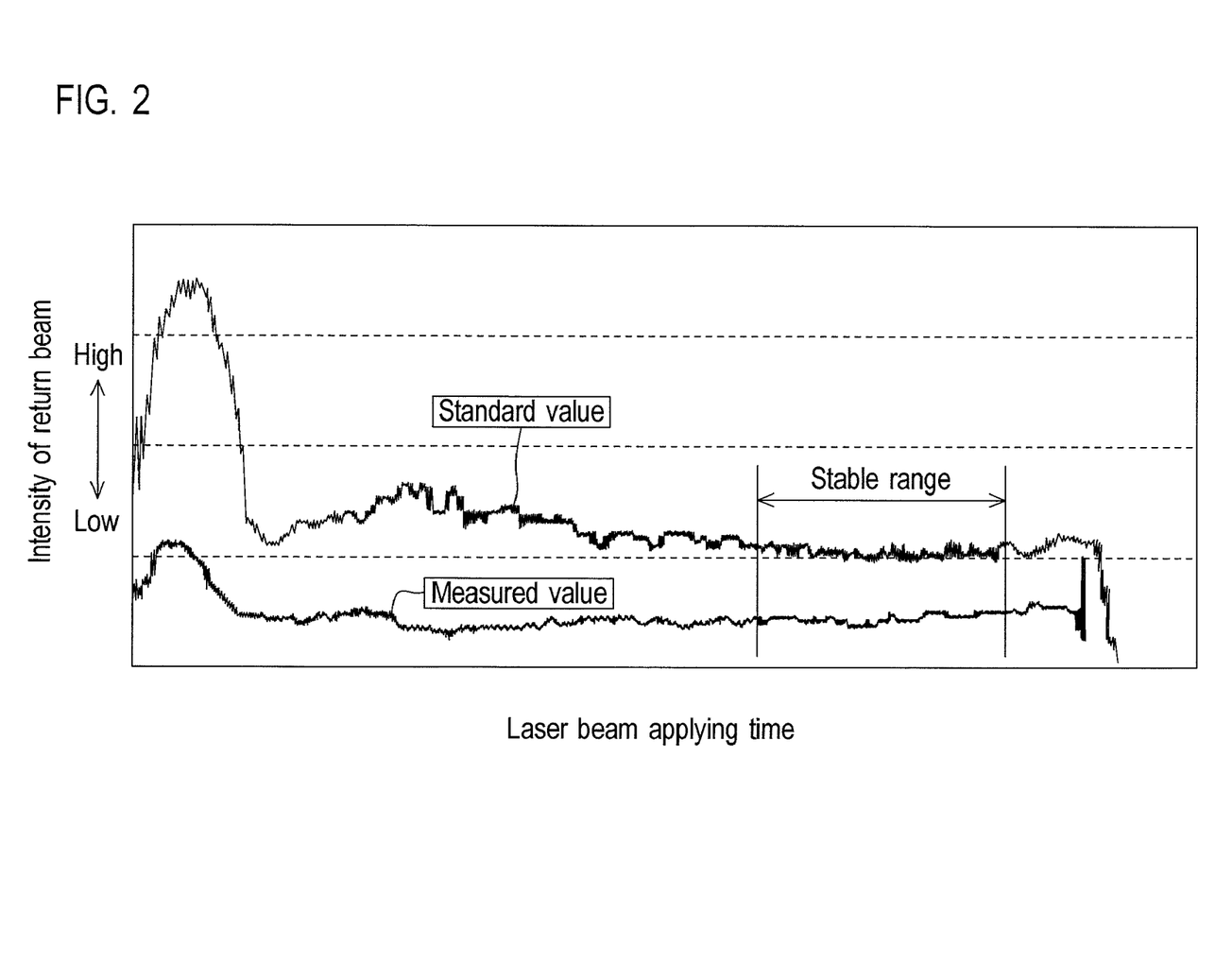
FIG. 2 shows a measurement result (comparison with a standard intensity) of an inspecting laser beam.
Figure 3:
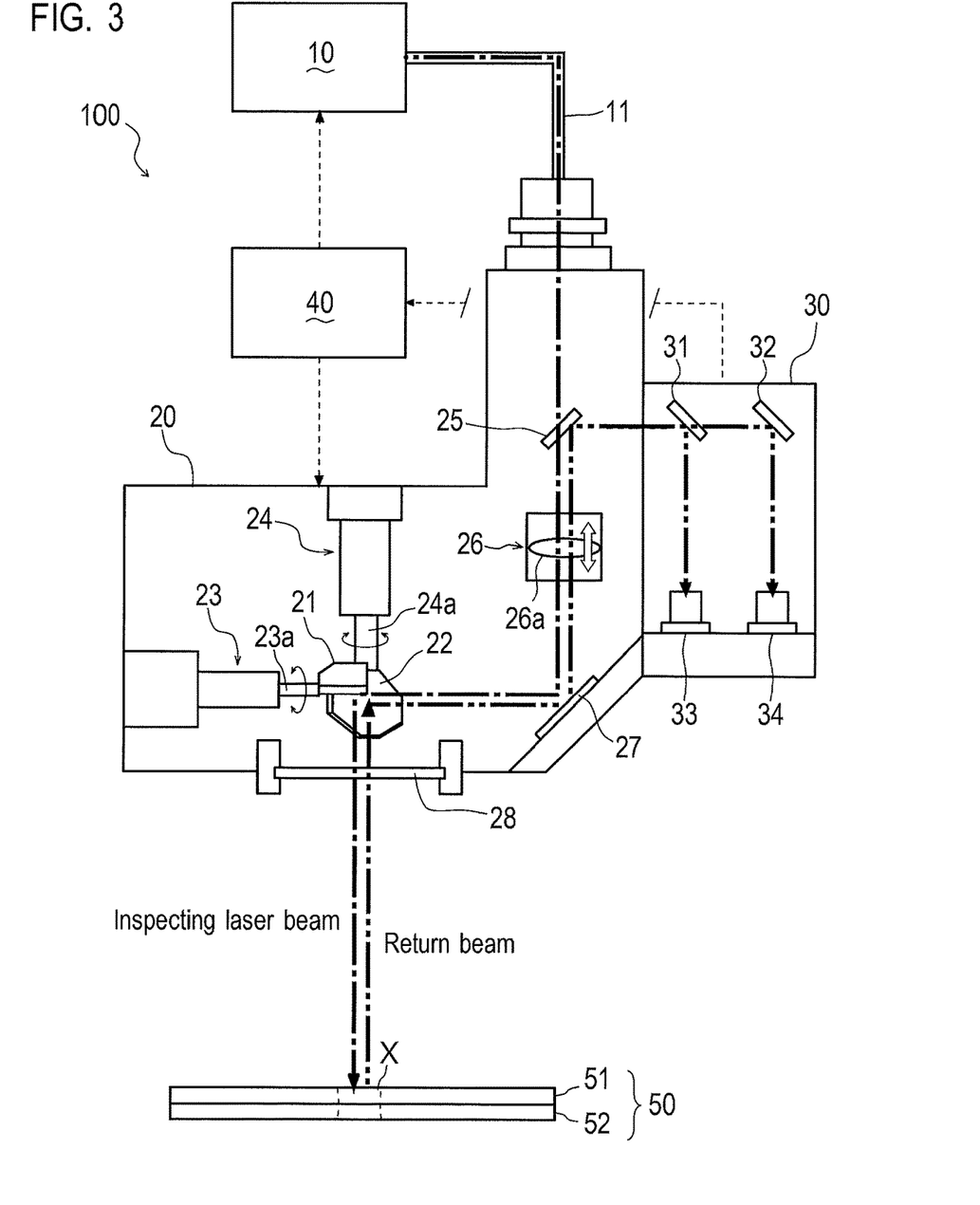
FIG. 3 shows how the laser processing device according to an embodiment emits the inspecting laser beam.

FIG. 2 shows a measurement result of the intensity of the return beam received by the optical receiver 30 (the sensor 34, in the present embodiment) for the case of applying a laser beam (hereinafter referred to a "inspecting laser beam") whose power is smaller than that of the laser beam during the laser welding into the welding portion X as shown in FIG. 3.

FIG. 3 schematically shows the structure of a laser processing device 100. In FIG. 3, for the sake of convenience, the inspecting laser beam is indicated by a one-dot chain line.

In the measurement of the present embodiment, the inspecting laser beam is emitted at 1000 W for approximately 0.02 seconds. The waveforms in FIG. 2 show the measurement result (wavelength: approximately 800 nm) of the intensity of the return beam received by the sensor 34, which is used in the present embodiment. However, a measurement result of the intensity of the return beam received by the sensor 33 may be used.

One of two waveforms in FIG. 2 shows the case of measuring the intensity of the return beam without the spatters on the protective glass 28, namely, without the decrease in power caused by dirt on the protective glass 28, and is used as a standard intensity when the amount of the decrease in power is calculated. The other waveform shows the case of measuring the intensity of the return beam with the spatters on the protective glass 28, namely, with the decrease in power caused by dirt on the protective glass 28.

In the calculation of the amount of the decrease in power of the inspecting laser beam, first, a stable part (see the stable range in FIG. 2) of the waveform is suitably extracted from each waveform. Next, a value obtained by averaging the measurement values of the one waveform within the stable range is compared with value obtained by averaging the measurement values of the other waveform within the stable range to calculate a difference of the intensity of the return beam of the inspecting laser beam.

Finally, from the calculated difference, the amount of the decrease in power of the laser beam during actual emission of the laser beam is calculated. It is preferable that a correlation between an amount of decrease in power of the inspecting laser beam and an amount of decrease in power of the laser beam during actual welding is previously obtained through an experiment or the like.

A method for calculating the amount of the focal deviation at the welding portion X is described with reference to FIGS. 4 and 5.

Figure 4:
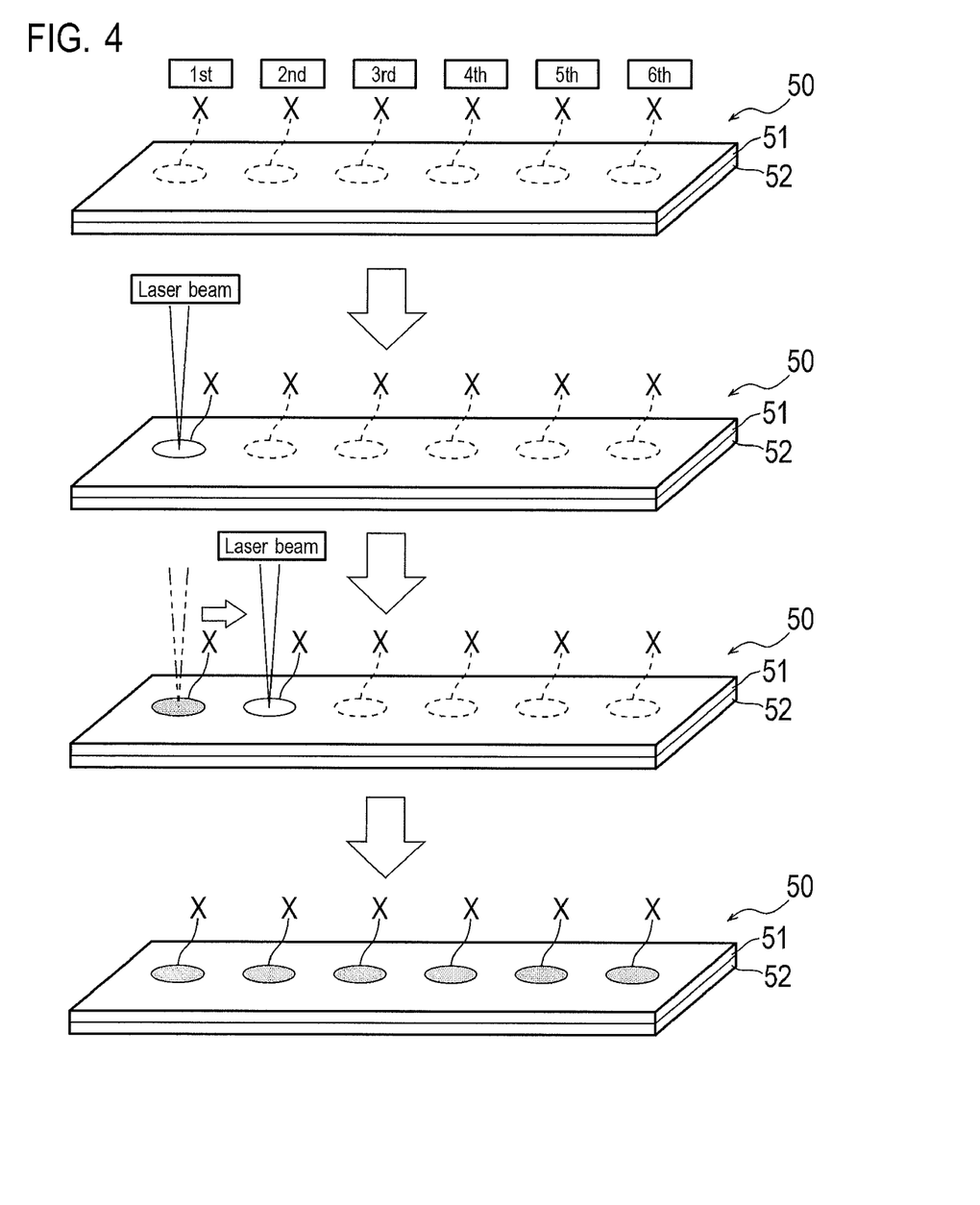
FIG. 4 shows how to perform laser welding in the laser welding method according to an embodiment.
Figure 5:
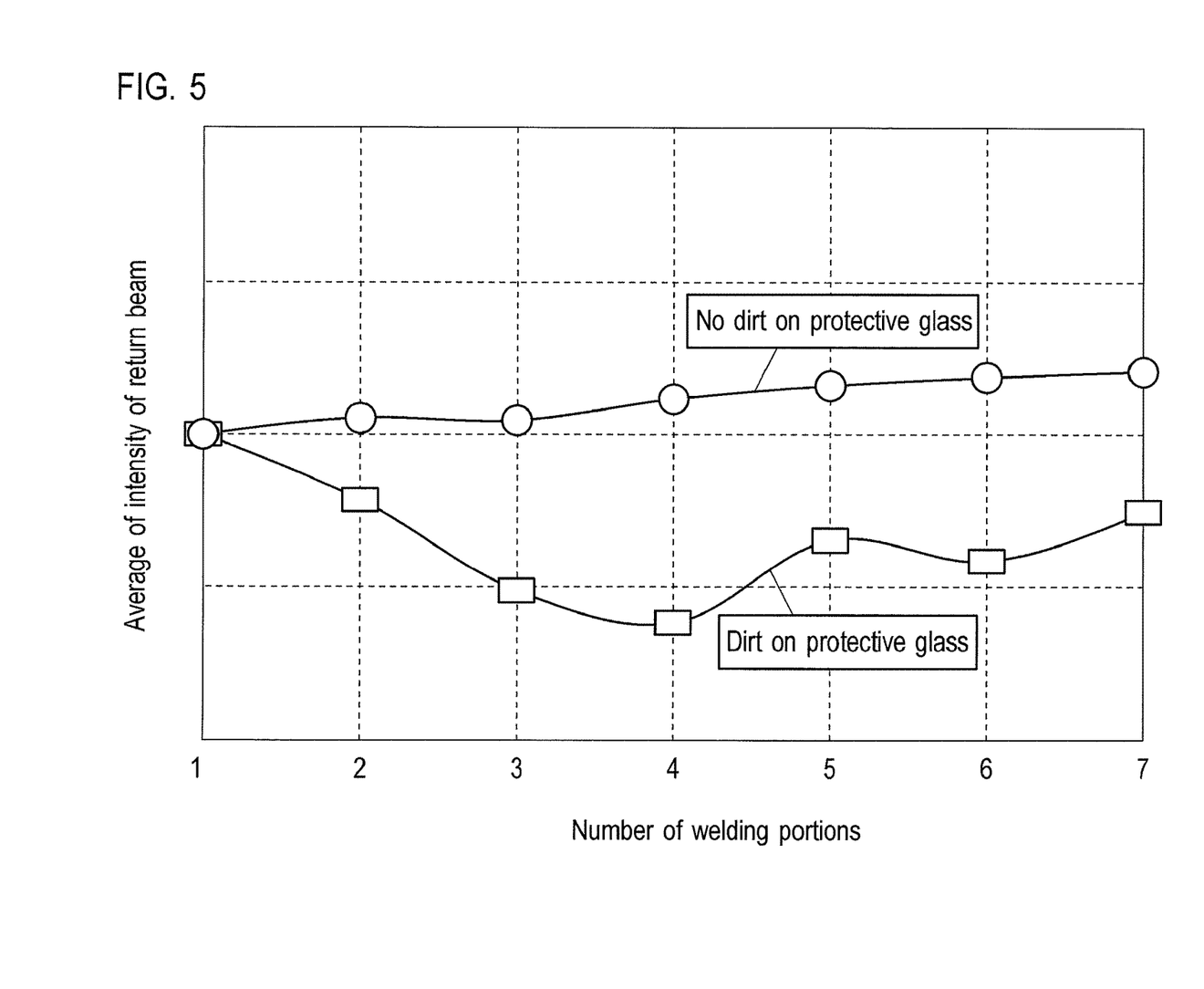
FIG. 5 shows a measurement result (variation depending on increase of the number of welded spots) of the inspecting laser beam.

FIG. 5 shows the decrease in power of the inspecting laser beam for the case of performing the laser welding to a plurality of points (see FIG. 4).

As shown in FIG. 4, in the laser welding method according to the embodiment, the laser welding is performed in a manner similar to spot welding so that the spot-like welding portions X are formed on the workpiece 50 at predetermined intervals.

In the laser welding method according to a first embodiment, the number of spots to be welded is settled. For example, in the case of FIG. 4, the number of the spots of the workpiece 50 to be welded is "6", and the laser welding is performed to first to sixth spots in order.

Note that the number of the spots to be welded reaches several hundred in a process for manufacturing parts of cars.

One of two measurement results in FIG. 5 shows the case of measuring the intensity of the return beam without the spatters on the protective glass 28, namely, without thermal lens effect caused by dirt on the protective glass 28. The other shows the case of measuring the intensity of the return beam with the spatters on the protective glass 28, namely, with the thermal lens effect caused by dirt on the protective glass 28.

The thermal lens effect is described below.

If the laser welding is performed with the spatters on the protective glass 28, the laser beam is absorbed by the spatters adhering to the protective glass 28, which results in increase in temperature of parts of the protective glass 28 around the spatters. When the temperature of the protective glass 28 is partly increased, the refractive index of parts whose temperature has increased is different from that of the other parts. As a result, the protective glass 28 acts similarly to a lens, and thereby the focal length of the laser beam varies.

The thermal lens effect is characterized in that the influence thereof becomes large in the case of emitting the laser beam continuously, namely, in the case of performing the laser welding continuously.

The thermal lens effect is not produced when the laser beam is not emitted. For this reason, immediately after the beginning of the laser welding (e.g., when the laser welding is performed to the first spot), the influence of the thermal lens effect can be ignored.

FIG. 5 shows that there is no decrease in power of the inspecting laser beam caused by the thermal lens effect at the first spot in spite of presence or absence of adhesion of the spatters.

Moreover, FIG. 5 shows that, in the case where the spatters do not adhere to the protective glass 28, there is no decrease in power of the inspecting laser beam caused by the thermal lens effect even if the laser welding is continuously performed. On the other hand, FIG. 5 shows that, in the case where the spatters adhere to the protective glass 28, the power of the laser beam decreases due to the thermal lens effect.

Note that the laser beam is not emitted temporarily between the fourth and fifth spots in FIG. 5. For this reason, at the fifth spot, the amount of the decrease in power of the inspecting laser beam caused by the thermal lens effect becomes small temporarily.

In the laser welding method according to the embodiment, the thermal lens effect is not produced at the first spot. For this reason, the amount of the decrease in power of the inspecting laser beam caused by the thermal lens effect is calculated at each spot after the first spot.

A method for calculating the amount of the decrease in power of the inspecting laser beam caused by the thermal lens effect is calculated, similarly to the above-mentioned method for calculating the amount of the decrease in power of the inspecting laser beam caused by the adhesion of the spatters, by averaging the measurement values, within the stable range, of the waveform indicating the intensity of the return beam of the inspecting laser beam.

At this time, a difference between the amount of the decrease in power of the inspecting laser beam measured before the laser welding to the first spot and the amount of the decrease in power of the inspecting laser beam measured at or after the second spot is considered to be the amount of the decrease in power of the inspecting laser beam caused by the thermal lens effect.

Actually, it appears that an amount of the adhering spatters increases when the laser welding is performed to the first spot. However, in the laser welding method according to the embodiment, the influence of the spatters is ignored, and it is assumed that the power of the laser beam varies due to the thermal lens effect when the laser welding is performed to each spot after the first spot.

In the laser welding method according to the embodiment, the amount of the focal deviation is calculated from the amount of the decrease in power of the inspecting laser beam caused by only the thermal lens effect.

Note that, in the calculation of the amount of the focal deviation of the laser beam, a correlation between the amount of the decrease in power of the inspecting laser beam and the amount of the focal deviation during actual welding is previously obtained through an experiment or the like.

The laser welding method according to the embodiment is described with reference to FIGS. 6 and 7.

Note that the protective glass 28 is sufficiently cooled at the beginning of the laser welding in the laser welding method according to the embodiment. Therefore, an influence (only the focal deviation caused by the thermal lens effect) on the laser welding before the beginning may be ignored.

The laser welding method according to the first embodiment is described below.

Figure 6:
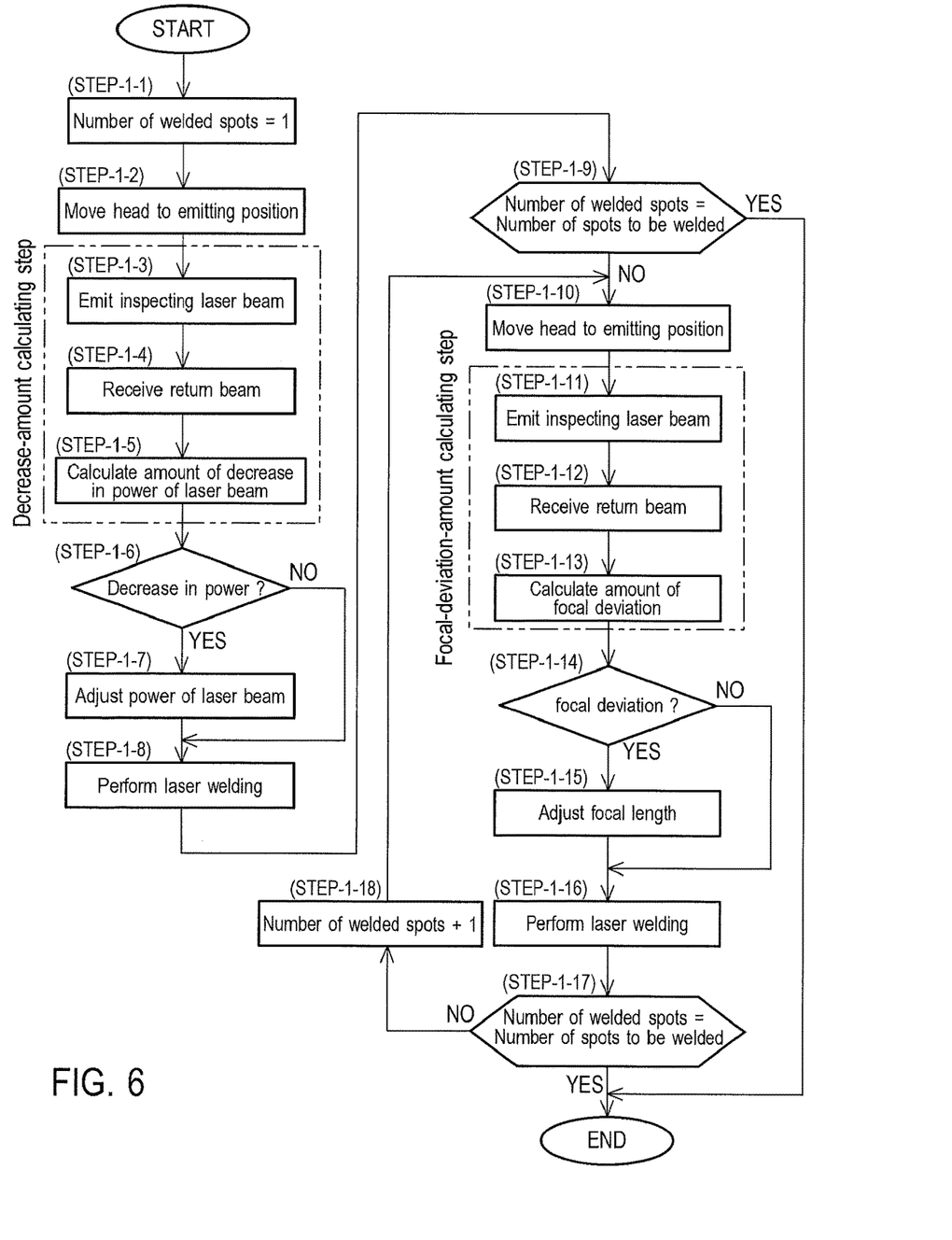
FIG. 6 shows the laser welding method according to a first embodiment.

As shown in FIG. 6, first, in the laser welding method according to the first embodiment, the controller 40 stores an initial value "1" (indicating the first spot) as the current number of times the laser welding has been performed (STEP-1-1).

The first spot is a place of the workpiece 50 to which the laser welding is performed first. When the laser welding is performed to the first spot, the protective glass 28 is sufficiently cooled.

At the second spot and the following spots, the thermal lens effect is produced. Until the laser welding to the final (sixth) spot is finished, the decrease in power caused by the thermal lens effect continues.

Before the laser welding is performed to a first spot of the next workpiece 50, the protective glass 28 is sufficiently cooled. For this reason, the thermal lens effect is not produced in the laser welding to the first spot of the next workpiece 50.

In the laser welding method according to the embodiment, the laser welding is performed under such a precondition.

The present embodiment shows the case of performing the laser welding with the laser processing device 100 in a manner similar to spot welding. However, a manner of the welding in the laser welding method is not limited thereto. For example, even in the case of performing the laser welding so as to form a bead continuously, the laser welding method according to the embodiments may be applied.

Moreover, in the case of performing the laser welding in the laser welding method according to the embodiment so that the spot-like welding portions X are continuously formed in a manner similar to spot welding, the adjacent welding portions X may overlap each other.

Next, in the laser welding method according to the first embodiment, the head of the laser processing device 100 is moved to such a position that the first spot can be irradiated with the laser beam (STEP-1-2). Thereafter, the first spot is irradiated with the inspecting laser beam (STEP-1-3).

The inspecting laser beam has a power smaller than that of the laser beam during the laser welding.

The inspecting laser beam is emitted for a short time (e.g., 0.02 seconds) at such a power as to melt the surface of the workpiece 50 so that the spatters are not produced. A condition on which the inspecting laser beam is emitted is suitably selected depending on, for example, material and thickness of a workpiece.

Then, in the laser welding method according to the first embodiment, the optical receiver 30 receives the return beam which is a reflected light of the inspecting laser beam from the first spot (STEP-1-4). Thereafter, the controller 40 measures the intensity of the return beam, and calculates the amount of the decrease in power of the inspecting laser beam based on the intensity of the return beam (STEP-1-5).

The amount of the decrease in power of the inspecting laser beam calculated at this time is caused by dirt on the protective glass 28 (except the amount of the decrease in power of the inspecting laser beam caused by the thermal lens effect).

Specifically, the controller 40 calculates the amount of the decrease in power of the inspecting laser beam from a difference between the measured intensity of the return beam and the standard intensity which is the intensity of the return beam of the inspecting laser beam measured using the protective glass with no spatters (see FIG. 2).

The laser welding method according to the first embodiment includes a step (hereinafter referred to as a "decrease-amount calculating step") performed before the step (STEP-1-8) for performing the laser welding by irradiating the welding portion X with the laser beam having a predetermined power. The decrease-amount calculating step includes the step (STEP-1-3) for irradiating the welding portion X with the inspecting laser beam having a power smaller than the predetermined power, the step (STEP-1-4) for receiving the return beam of the inspecting laser beam with the optical receiver 30, and the step (STEP-1-5) for measuring the intensity of the return beam of the inspecting laser beam with the controller 40 and for comparing, with the controller 40, the intensity of the return beam of the inspecting laser beam with the previously obtained standard intensity of the return beam of the inspecting laser beam to calculate the amount of the decrease in power of the inspecting laser beam at the welding portion X.

After calculating the amount of the decrease in power of the inspecting laser beam at the welding portion X, the controller 40 determines, based on the result of the calculation, whether the power of the inspecting laser beam decreases or not (STEP-1-6).

If the controller 40 determines that the power of the inspecting laser beam decreases (i.e., dirt (spatters) adheres to the protective glass 28), the controller 40 adjusts the power of the laser beam so as to make up for an insufficiency of the power of the laser beam (STEP-1-7). Thereafter, the laser welding is performed (STEP-1-8).

Specifically, the output of the laser oscillator 10 is increased by an instruction signal of the controller 40, and then the laser welding is performed.

On the other hand, if the controller 40 determines that the power of the inspecting laser beam does not decrease (i.e., dirt (spatters) does not adhere to the protective glass 28), the laser welding is performed (STEP-1-8) with no change of the power.

In the present embodiment, if the power of the laser beam decreases, the power is adjusted. However, for example, in the case where a large amount of spatters adhere to the protective glass, the laser welding may be stopped depending on degree of the decrease in power.

Then, the laser welding is performed to the welding portion X, and thereafter the number of the welded spots is checked (STEP-1-9).

If the number of the spots to be welded is one, the laser welding is finished. If the number of the spots to be welded is two or more, steps for performing the laser welding to the next welding portion X are performed.

Then, in the laser welding method according to the first embodiment, the head of the laser processing device 100 is moved to such a position that the second spot can be irradiated with the laser beam (STEP-1-10). Thereafter, the second spot (i.e., the next welding portion X) is irradiated with the inspecting laser beam (STEP-1-11).

Then, in the laser welding method according to the first embodiment, the optical receiver 30 receives the return beam which is a reflected light of the inspecting laser beam from the next welding portion X (STEP-1-12). Thereafter, the controller 40 measures the intensity of the return beam, and calculates the amount of the focal deviation based on the intensity of the return beam (STEP-1-13).

In the laser welding method according to the first embodiment, after the step (STEP-1-8) for performing the laser welding to the welding portion X at least once is performed, the step (STEP-1-16) for performing the laser welding to the next welding portion X is performed. Before the step (STEP-1-16) for performing the laser welding to the next welding portion X is performed, a step (hereinafter referred to as a "focal-deviation-amount calculating step") is performed. The focal-deviation-amount calculating step includes the step (STEP-1-11) for emitting the inspecting laser beam to the next welding portion X, the step (STEP-1-12) for receiving the return beam of the inspecting laser beam from the next welding portion X with the optical receiver 30, the step (STEP-1-13) for measuring the intensity of the return beam of the inspecting laser beam from the next welding portion X with the controller 40 and for calculating, with the controller 40, the amount of the focal deviation of the laser beam at the next welding portion X based on the intensity of the return beam of the inspecting laser beam from the next welding portion X and the amount of the decrease in power of the inspecting laser beam calculated in the decrease-amount calculating step.

In the calculation of the amount of the focal deviation, the amount of the decrease in power of the inspecting laser beam calculated in the step (STEP-1-5) is used.

The intensity of the return beam from each of the second welding portion X and the following welding portions X is measured in a state where the decrease in power caused by only dirt on the protective glass 28 and the decrease in power caused by the thermal lens effect are combined with each other.

Therefore, if the intensity of the return beam measured before the laser welding to the first welding portion X is subtracted from the intensity of the return beam from each of the second welding portion X and the following welding portions X, the decrease in power caused by only the thermal lens effect is calculated.

The amount of the focal deviation at the welding portion X is calculated from the decrease in power caused by only the thermal lens effect. The amount of the focal deviation at the welding portion X is calculated based on the correlation (relationship between the amount of the decrease in power of the inspecting laser beam and the amount of the focal deviation) which is previously obtained through an experiment or the like.

After calculating the amount of the focal deviation at the welding portion X, the controller 40 determines whether the focus deviates or not (STEP-1-14).

If the controller 40 determines that the focus deviates (i.e., the thermal lens effect is produced in the protective glass 28), the controller 40 feeds back the amount of the focal deviation to the focus adjuster 26 to adjust the focal length (STEP-1-15). Thereafter, the laser welding is performed (STEP-1-16).

On the other hand, if the controller 40 determines that the focus does not deviate (i.e., the thermal lens effect is not produced in the protective glass 28), the laser welding is performed (STEP-1-16) with no change of the focal length.

The laser welding method according to the first embodiment includes a focal-length adjusting step (STEP-1-15) for adjusting the focus adjuster 26 based on the amount of the focal deviation to adjust the focal length with the controller 40. The focal-length adjusting step is performed after the focal-deviation-amount calculating step (STEP-1-11 to STEP-1-13) is performed and before the step (STEP-1-16) for performing the laser welding to the next welding portion X is performed.

In the present embodiment, if it is determined that the focus deviates, the focal length is adjusted. However, the laser welding may be stopped depending on degree of the focal deviation.

Then, the laser welding is performed to the welding portion X, and thereafter the number of the welded spots is checked (STEP-1-17).

If the number of the welded spots reaches the number of the spots to be welded, the laser welding is finished. If the number of the welded spots does not reach the number of the spots to be welded, "1" is added to the number of the welded spots (STEP-1-18). Thereafter, the steps for performing the laser welding to the next welding portion X are performed.

As mentioned above, the flow of the laser welding method according to the first embodiment is shown.

In the laser welding method according to the first embodiment, after the laser welding is performed to the welding portion X at least once, the laser welding is performed to the next welding portion X. Before the laser oscillator 10 and the optical system 20 perform the laser welding to the next welding portion X, the focal-deviation-amount calculating step is performed. The focal-deviation-amount calculating step includes emitting the inspecting laser beam to the next welding portion X, receiving the return beam of the inspecting laser beam from the next welding portion X with the optical receiver 30, measuring the intensity of the return beam of the inspecting laser beam from the next welding portion X with the controller 40, and calculating, with the controller 40, the amount of the focal deviation of the laser beam at the next welding portion X based on the intensity of the return beam of the inspecting laser beam from the next welding portion X and the amount of the decrease in power of the inspecting laser beam calculated in the decrease-amount calculating step.

This makes it possible to detect the focal deviation caused by the thermal lens effect.

In the laser welding method according to the first embodiment, the optical system 20 of the laser processing device 100 includes the focus adjuster 26 which adjusts the focal length of the laser beam. The laser welding method according to the first embodiment includes the focal-length adjusting step for adjusting the focus adjuster 26 based on the amount of the focal deviation to adjust the focal length with the controller 40, the focal-length adjusting step being performed after the focal-deviation-amount calculating step is performed and before the laser welding is performed to the next welding portion X. In the laser welding method according to the first embodiment, after the focal-length adjusting step is performed, the laser welding is performed to the next welding portion X by the laser processing device 100.

This makes it possible to detect the focal deviation caused by the thermal lens effect, and to prevent the laser welding from being performed with the laser beam whose power is reduced. Therefore, it is possible to reliably restrain poor welding in the laser welding.

The laser welding method according to embodiments may include only the decrease-amount calculating step.

Figure 7:
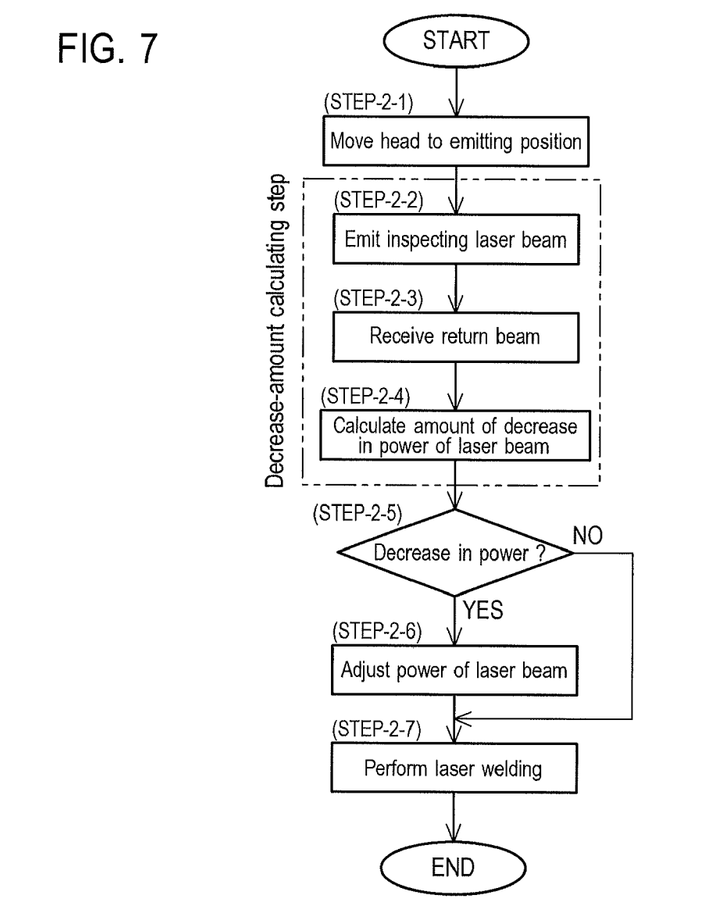
FIG. 7 shows the laser welding method according to a second embodiment.

FIG. 7 shows the flow of the laser welding method according to a second embodiment. The laser welding method according to the second embodiment includes only the decrease-amount calculating step.

As shown in FIG. 7, first, in the laser welding method according to the second embodiment, the head of the laser processing device 100 is moved to such a position that the first spot can be irradiated with the laser beam (STEP-2-1). Thereafter, the first spot (i.e., the first welding portion X) is irradiated with the inspecting laser beam (STEP-2-2).

Then, in the laser welding method according to the second embodiment, the optical receiver 30 receives the return beam which is a reflected light of the inspecting laser beam from the first welding portion X (STEP-2-3). Thereafter, the controller 40 measures the intensity of the return beam, and calculates the amount of the decrease in power of the inspecting laser beam at the welding portion X based on the intensity of the return beam (STEP-2-4).

The amount of the decrease in power of the inspecting laser beam calculated at this time is caused by dirt on the protective glass 28 (except the amount of the decrease in power of the inspecting laser beam caused by the thermal lens effect).

The laser welding method according to the second embodiment includes the decrease-amount calculating step performed before the step (STEP-2-7) for performing the laser welding by irradiating the welding portion X with the laser beam having a predetermined power. The decrease-amount calculating step includes the step (STEP-2-2) for irradiating the welding portion X with the inspecting laser beam having a power smaller than the predetermined power, the step (STEP-2-3) for receiving the return beam of the inspecting laser beam with the optical receiver 30, and the step (STEP-2-4) for measuring the intensity of the return beam of the inspecting laser beam with the controller 40 and for comparing, with the controller 40, the intensity of the return beam of the inspecting laser beam with the previously obtained standard intensity of the return beam of the inspecting laser beam to calculate the amount of the decrease in power of the inspecting laser beam at the welding portion X.

After calculating the amount of the decrease in power of the inspecting laser beam at the welding portion X, the controller 40 determines, based on the result of the calculation, whether the power of the inspecting laser beam decreases or not (STEP-2-5).

If the controller 40 determines that the power of the inspecting laser beam decreases (i.e., dirt (spatters) adheres to the protective glass 28), the controller 40 adjusts the power of the laser beam so as to make up for an insufficiency of the power of the laser beam (STEP-2-6). Thereafter, the laser welding is performed (STEP-2-7).

Specifically, the output of the laser oscillator 10 is increased by the instruction signal of the controller 40.

On the other hand, if the controller 40 determines that the power of the inspecting laser beam does not decrease (i.e., dirt (spatters) does not adhere to the protective glass 28), the laser welding is performed (STEP-2-7) with no change of the power.

As mentioned above, the flow of the laser welding method according to the second embodiment is shown.

The laser welding method according to the second embodiment includes performing the laser welding to the welding portion X of the workpiece 50, using the laser processing device 100. The laser processing device 100 includes the laser oscillator 10, the optical system 20 which irradiates the welding portion X with the laser beam emitted from the laser oscillator 10, the protective glass 28 which is arranged at the end part of the optical system 20 facing the welding portion X, the optical receiver 30 which receives the return beam incident into the optical system 20 out of the laser beam reflected on the welding portion X, and the controller 40 which controls the output of the laser oscillator 10 based on the intensity of the return beam received by the optical receiver 30. The laser welding method according to the second embodiment includes the decrease-amount calculating step performed before the laser welding is performed by irradiating the welding portion X with the laser beam having a predetermined power. The decrease-amount calculating step includes irradiating the welding portion X with the inspecting laser beam having a power smaller than the predetermined power, receiving the return beam of the inspecting laser beam with the optical receiver 30, measuring the intensity of the return beam of the inspecting laser beam with the controller 40, and comparing, with the controller 40, the intensity of the return beam of the inspecting laser beam with the previously obtained standard intensity of the return beam of the inspecting laser beam to calculate the amount of the decrease in power of the inspecting laser beam at the welding portion X.

This makes it possible to easily detect the dirt on the protective glass 28 using the laser processing device 100 configured similarly to a conventional one, and to prevent the laser welding from being performed with the laser beam whose power is reduced. Therefore, it is possible to restrain poor welding in the laser welding.

In the laser welding to one workpiece 50 in the present embodiment, after any spot is welded and before the next spot is welded, the amount of the focal deviation is calculated and the calculation result is fed back. However, a method for feeding back the amount of the focal deviation is not limited thereto.

For example, the amount of the focal deviation may be fed back as follows:

In the case where the number of the welding portions X (the number of spots to be welded) of one workpiece 50 is "n", the amount of the focal deviation at each of the first to nth welding portions X is calculated and stored during the laser welding of any workpiece 50. Before the laser welding is performed to each of the first to nth welding portions X of the next (second) workpiece 50, the inspecting laser beam is applied to each of the first to nth welding portions X of the second workpiece 50 to measure the intensity of the return beam of the inspecting laser beam therefrom. At this time, the amount of the focal deviation at each of the first to nth welding portions X of the second workpiece 50 is not calculated. Further, before the laser welding is performed to each of the first to nth welding portions X of the second workpiece 50, the amount of the focal deviation at each of the first to nth welding portions X of the first workpiece 50 is fed back. Before the laser welding is performed to the workpiece 50 after the next (third workpiece 50), the amount of the focal deviation at each of the first to nth welding portions X of the second workpiece 50 is calculated based on the measured intensity, and is fed back.

This makes it possible to calculate all the focal deviations at the same time when the workpiece 50 to be welded is replaced, which eliminates the need to calculate the focal deviation before laser welding of each spot. Therefore, it is possible to accelerate the movement to the next spot, and consequently to accelerate the laser welding.

What is claimed is:

1. A laser welding method for performing laser welding to welding portions of a workpiece, using a laser processing device including: (a) a laser oscillator; (b) an optical system which irradiates the welding portion with a laser beam emitted from the laser oscillator; (c) a protective glass which is arranged at an end part of the optical system facing the welding portion; (d) an optical receiver which receives a return beam that is incident into the optical system from reflection of the laser beam by the welding portion; and (e) a controller which controls an output of the laser oscillator based on an intensity of the return beam received by the optical receiver, the laser welding method, comprising:
(1) calculating a decrease amount of the laser power before the welding portion is irradiated with the laser beam having a predetermined power, calculating the decrease amount including:
 (1a) emitting an inspecting laser beam having a power smaller than the predetermined power to the welding portion with the laser oscillator and the optical system;
 (1b) receiving the return beam of the inspecting laser beam having passed through the protective glass with the optical receiver;
 (1c) measuring an intensity of the return beam of the inspecting laser beam with the controller; and
 (1d) calculating, with the controller, an amount of decrease in power of the inspecting laser beam by comparing the intensity of the return beam of the inspecting laser beam with a previously-determined standard intensity of the return beam of the inspecting laser beam,
(2) adjusting the output of the laser oscillator, using the controller, based on the calculated amount of the decrease in power of the inspecting laser beam; and
(3) emitting the laser beam at the adjusted output to the welding portion to perform the laser welding with the laser processing device.

2. The laser welding method according to claim 1, further comprising:
calculating a focal-deviation-amount after the laser welding has been performed to the welding portion at least once and before the laser welding is performed to a next welding portion, calculating the focal-deviation-amount including:
 emitting the inspecting laser beam to the next welding portion with the laser oscillator and the optical system;
 receiving the return beam of the inspecting laser beam from the next welding portion with the optical receiver;
 measuring the intensity of the return beam of the inspecting laser beam from the next welding portion with the controller; and
 calculating, with the controller, an amount of focal deviation of the laser beam at the next welding portion based on the intensity of the return beam of the inspecting laser beam from the next welding portion and the amount of the decrease in power of the inspecting laser beam calculated in the step (1) of calculating the decrease amount of the laser power.

3. The laser welding method according to claim 2, further comprising:
adjusting a focal length of the laser beam with a focus adjuster of the optical system based on the calculated amount of the focal deviation, after performing the step of calculating the focal-deviation-amount and before the laser welding is performed to the next welding portion by the laser processing device; and
performing the laser welding to the next welding portion with the laser processing device after adjusting the focal length.

* * * * *